US010295095B2

(12) United States Patent
Haringstad

(10) Patent No.: US 10,295,095 B2
(45) Date of Patent: May 21, 2019

(54) METHOD AND SYSTEM FOR INSTALLING A GASKET

(71) Applicants: Karmsund Maritime Group AS, Kopervik (NO); Morgan Haringstad, Kopervik (NO)

(72) Inventor: Morgan Haringstad, Kopervik (NO)

(73) Assignees: Morgan Haringstad, Kopervik (NO); Karmsund Maritime Group AS, Kopervik (NO)

(*) Notice: Subject to any disclaimer, the term of this patent is extended or adjusted under 35 U.S.C. 154(b) by 0 days.

(21) Appl. No.: 15/574,641

(22) PCT Filed: Jun. 16, 2016

(86) PCT No.: PCT/NO2016/050129
§ 371 (c)(1),
(2) Date: Nov. 16, 2017

(87) PCT Pub. No.: WO2016/209083
PCT Pub. Date: Dec. 29, 2016

(65) Prior Publication Data
US 2018/0119854 A1  May 3, 2018

(30) Foreign Application Priority Data

Jun. 22, 2015 (NO) .................................. 20150818

(51) Int. Cl.
*F16L 23/16* (2006.01)
*F16L 23/18* (2006.01)
*F16L 23/00* (2006.01)

(52) U.S. Cl.
CPC ............. *F16L 23/18* (2013.01); *F16L 23/003* (2013.01)

(58) Field of Classification Search
CPC ................................ F16L 23/18; F16L 23/003
See application file for complete search history.

(56) References Cited

U.S. PATENT DOCUMENTS 1,896,795 A * 2/1933 Kendall ................. F16L 23/20
  277/609
2,200,688 A   5/1940 Bridgers
(Continued)

FOREIGN PATENT DOCUMENTS

| EP | 2505313 | 10/2012 |
|----|---------|---------|
| JP | H9317964 | 12/1997 |
| WO | 2015/073008 | 5/2015 |

OTHER PUBLICATIONS

Norwegian Search Report, Norwegian Patent Application No. 20150818, dated Jan. 22, 2016.
(Continued)

*Primary Examiner* — Gilbert Y Lee
(74) *Attorney, Agent, or Firm* — Andrus Intellectual Property Law, LLP

(57) ABSTRACT

A method is for installing a gasket between two pipe-flange halves, the pipe-flange halves being designed to be brought together by bolts extending through bolt holes in the pipe-flange halves. The method comprises: arranging at least two installation bodies between the pipe-flange halves; attaching the installation bodies to respective bolts; letting the installation bodies form a gasket stop at a desired radial distance from a center axis of the pipe-flange halves; inserting the gasket between the pipe-flange halves until it hits the installation bodies; and clamping the gasket between the pipe-flange halves with the bolts. A system for use in practicing the method is described as well.

5 Claims, 4 Drawing Sheets

(56) References Cited

U.S. PATENT DOCUMENTS

| | | | |
|---|---|---|---|
| 3,730,537 A | 5/1973 | Ward et al. | |
| 4,495,689 A * | 1/1985 | McNeal | B25B 27/0028 |
| | | | 269/238 |
| 4,495,690 A * | 1/1985 | McNeal | B25B 13/52 |
| | | | 269/131 |
| 8,025,080 B2 * | 9/2011 | Orleskie | G01F 1/42 |
| | | | 138/44 |
| 8,944,721 B2 * | 2/2015 | Field | B25B 27/0028 |
| | | | 29/270 |
| 9,522,462 B2 * | 12/2016 | Baker | B25B 27/0028 |
| 10,088,077 B2 * | 10/2018 | Leary | F16L 1/26 |
| 2011/0167607 A1 | 7/2011 | Vidrine et al. | |
| 2015/0130139 A1 * | 5/2015 | Leary | F16L 1/26 |
| | | | 277/314 |

OTHER PUBLICATIONS

International Search Report, PCT/NO2016/050129, dated Sep. 16, 2016.
Written Opinion and Reply, PCT/NO2016/050129, dated Sep. 16, 2016.
Written Opinion, PCT/NO2016/050129, dated Apr. 25, 2017.
International Preliminary Report on Patentability, dated Sep. 12, 2017.

* cited by examiner

I-I

METHOD AND SYSTEM FOR INSTALLING A GASKET

CROSS-REFERENCE TO RELATED APPLICATIONS

This application is the U.S. national stage application of International Application PCT/NO2016/050129, filed Jun. 16, 2016, which international application was published on Dec. 29, 2016, as International Publication WO 2016/209083 in the English language. The International Application claims priority of Norwegian Patent Application No. 20150818, filed Jun. 22, 2015. The international application and Norwegian application are both incorporated herein by reference, in entirety.

FIELD

This invention relates to a method for installing a gasket. It relates, more particularly, to a method for installing a gasket between two pipe-flange halves, the pipe-flange halves being designed to be brought together by means of bolts extending through boltholes in the pipe-flange halves. The invention also includes a system for installing a gasket.

BACKGROUND

When conventional pipe-flange connections are being installed, wherein a gasket is placed between two pipe-flange halves and clamped by means of the bolts of the flange connection, it is a considerable problem that the gasket is being misplaced during the installation. This may result in the gasket being damaged during the torquing or in it not sealing because it sits incorrectly. The problem is greatest where the flange connection is placed somewhere with limited access, like under water or in a confined place.

It is known to place the gasket in a tool before inserting it between the pipe-flange halves. US2011/0167607 discloses such a tool. It has turned out that the use of such tools does not always give the correct positioning of the gasket relative to the pipe-flange halves.

From U.S. Pat. No. 3,730,537 A, a seal body is known, which is provided with two radially projecting, plate-shaped portions which form a centring means or web oriented in a plane perpendicular to the center axis of the seal body and which constitute part of the seal body and extend outwards from the periphery of the actual seal ring. A projecting portion is provided with a pair of fingers arranged symmetrically, forming an abutment against a first bolt, and a further, diametrically opposite portion of the centring means is provided with a handle and an opening for receiving a second bolt. The gasket is thereby fixed on two bolts before the flanges are brought together.

EP2505313A1 discloses a handle, which, at one end portion, is provided with a magnetic shoe arranged to rest against the periphery of a ferromagnetic sealing ring during the insertion and centring of the sealing ring between flanges.

SUMMARY

The invention has for its object to remedy or reduce at least one of the drawbacks of the prior art or at least provide a useful alternative to the prior art.

The object is achieved through the features, which are specified in the description below and in the claims that follow.

According to the invention, at least two installation bodies are placed between two pipe-flange halves. The installation bodies have gasket stops at a desired radial distance from the center axis of the pipe-flange halves, which is ensured by placing the installation bodies on bolts that are in corresponding boltholes in the pipe-flange halves.

The gasket may then be inserted between the pipe-flange halves until it hits the installation bodies. The use of two installation bodies arranged on respective bolts ensures that the gasket will come into the correct position.

After the pipe-flange halves have been brought sufficiently together, the installation bodies may be removed.

The invention is defined by the independent claims. The dependent claims define advantageous embodiments of the invention.

In a first aspect, the invention relates more specifically to a method for installing a gasket between two pipe-flange halves, the pipe-flange halves being designed to be brought together by means of bolts extending through bolt holes in the pipe-flange halves, the method comprising:
  arranging at least two installation bodies between the pipe-flange halves;
  attaching the installation bodies to respective bolts,
  letting the installation bodies form a gasket stop which is at a desired radial distance from a center axis of the pipe-flange halves;
  providing an auxiliary tool;
  inserting a gasket between the pipe-flange halves by means of the auxiliary tool until the gasket hits the installation bodies;
  retracting the auxiliary tool from between the pipe-flange halves; and
  clamping the gasket between the pipe-flange halves by means of the bolts.

By bolts are meant, here, the bolts that are used for bringing the pipe-flange halves together.

The method may include removing the installation bodies from the flange halves.

In a second aspect, the invention relates more specifically to a system for installing a gasket between two pipe-flange halves, the pipe-flange halves being designed to be brought together by means of bolts extending through boltholes in the pipe-flange halves, and the system including at least two installation bodies being arranged to be attached to respective bolts, forming gasket stops between the pipe-flange halves at a desired radial distance from the center axis of the pipe-flange halves, wherein each installation body is provided with a handle, and an auxiliary tool arranged for inserting the gasket between the brought-together pipe-flange halves, is provided with a handle extending outside a periphery of the pipe-flange halves during the installation of the gasket.

The fact that the installation bodies are attached to the bolts ensures that the installation bodies are in correct positions relative to the pipe-flange halves. Letting the installation bodies just abut against the bolts will not ensure that the installation bodies are in the right positions.

In some cases, the installation bodies may be held in position by means of axle pieces, for example, which are placed in the relevant boltholes. This is to be considered as covered by the set of claims even though the pipe-flange halves are pulled together by means of other bolts.

The installation bodies may be provided with through openings for the bolts. This gives the best guarantee of the installation bodies being in the desired positions. By the installation bodies being formed as annular discs, the gasket stop will remain in the right position regardless of the rotational angles of the installation bodies around the bolts. The installation bodies may, with advantage, be provided with handles. In this connection, the term handle covers an ROV attachment (ROV=Remotely Operated Vehicle), for example.

The pipe-flange halves may be unlike; one of them may be a blind flange, for example.

The method and the system according to the invention enables a reliable relative positioning of the gasket between two flange halves by the very fact of the installation bodies' being fixed between the flange halves also in the radial direction. Leakage problems that are due to incorrect positioning of the gasket during the installation or damage caused to the gasket because it was not correctly positioned at the start of the torquing are thereby avoided. The method and the system are equally well suited for groove gaskets as for flat gaskets.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
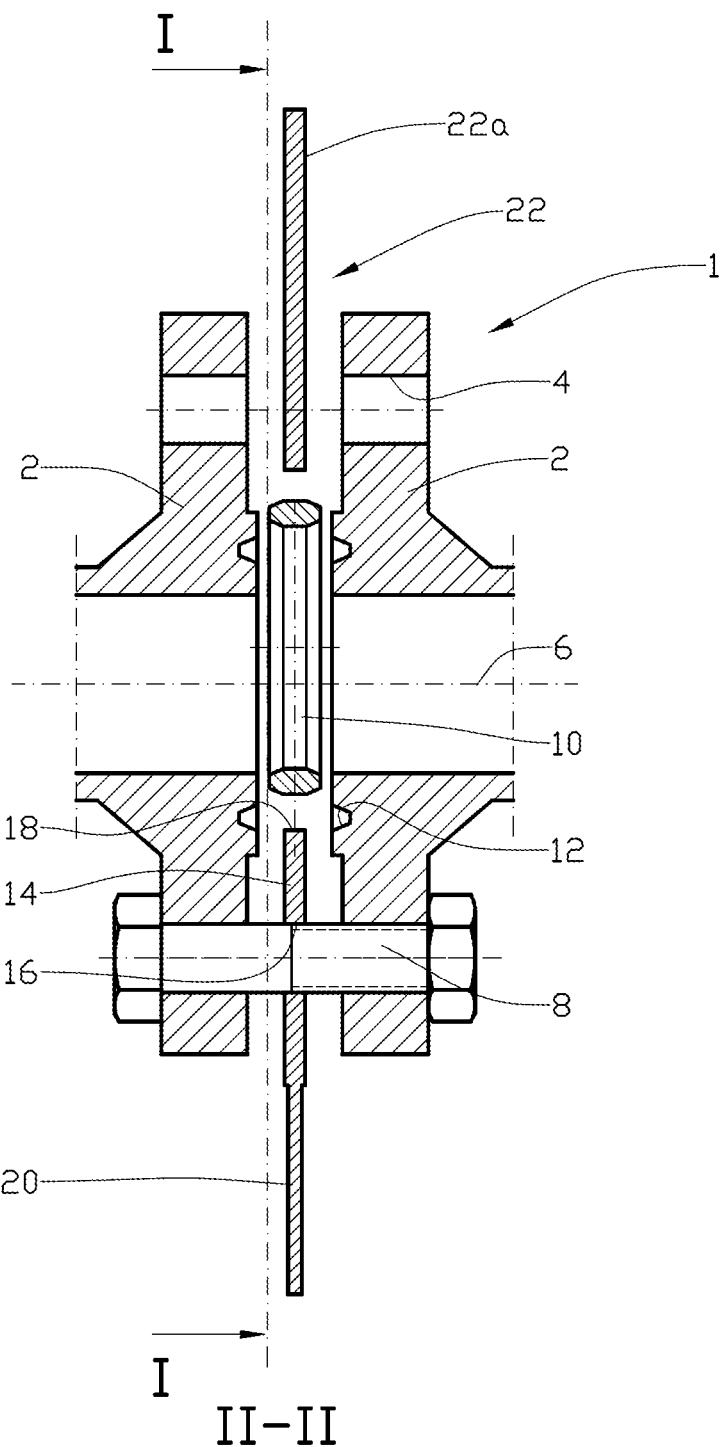
FIG. 1 shows an axial section II-II according to FIG. 2 of a groove gasket during insertion between two flange halves in a pipe-flange connection.

In the drawings, the reference numeral 1 indicates a pipe-flange connection comprising two pipe-flange halves 2. The pipe-flange halves 2 are fixed to pipes not shown. The pipe-flange halves 2 are provided, in a manner known per se, with a number of boltholes 4, which are distributed around a center axis 6 of the pipe-flange connection 1. The pipe-flange halves 2 are brought together by means of bolts 8 extending through their respective boltholes 4.

In this embodiment shown, a gasket 10 consists of a groove gasket, which is arranged to seal against annular grooves 12 in the pipe-flange halves 2.

In FIG. 1, an installation body 14 is arranged between the pipe-flange halves 2, and the installation body 14 is attached to one of the bolts 8. Here, the installation body 14 consists of an annular disc with a through opening 16 for the bolt 8. Externally, the periphery of the installation body 14 constitutes a gasket stop 18. The gasket stop 18 is at a desired radial distance from the center axis 6. The installation body 14 is provided with a handle 20.

Figure 2:
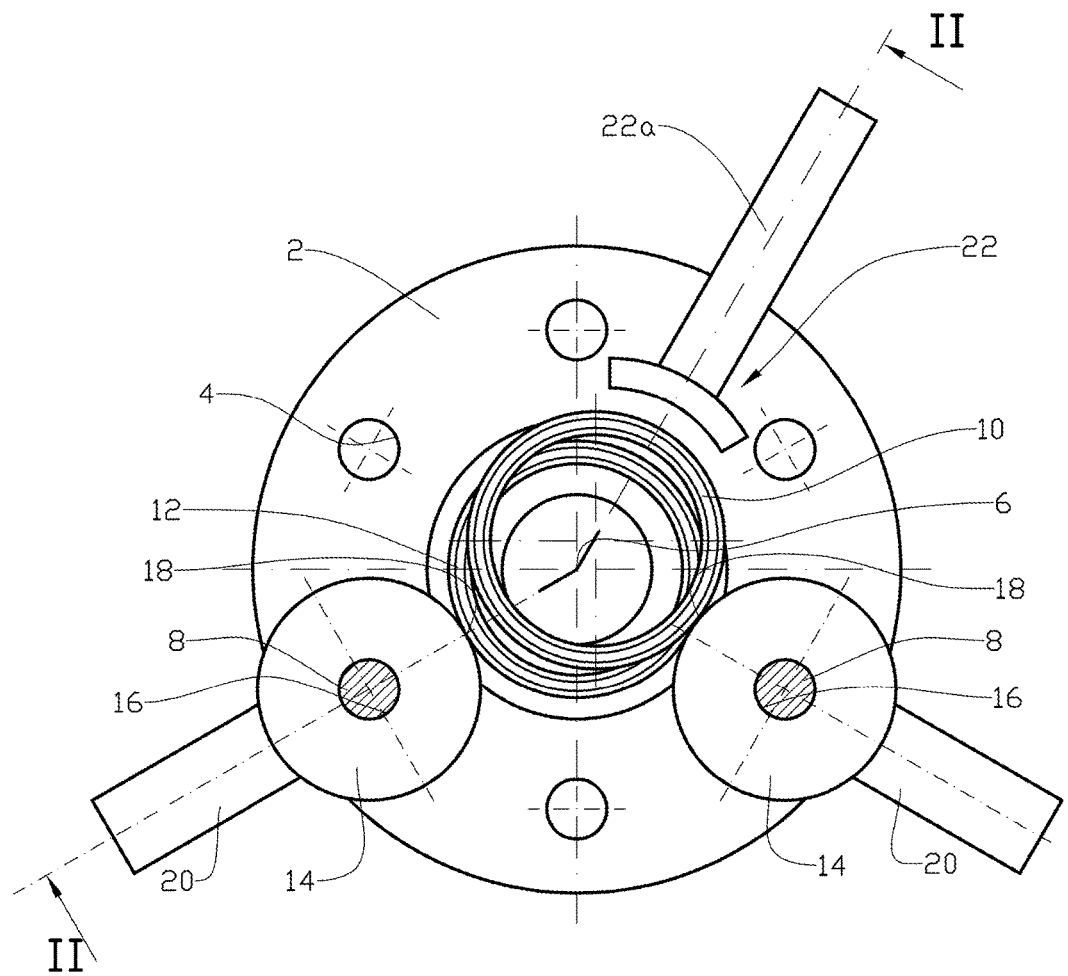
FIG. 2 shows a radial section I-I according to FIG. 1 of the groove gasket during insertion between the pipe-flange halves in the pipe-flange connection.
Figure 3:
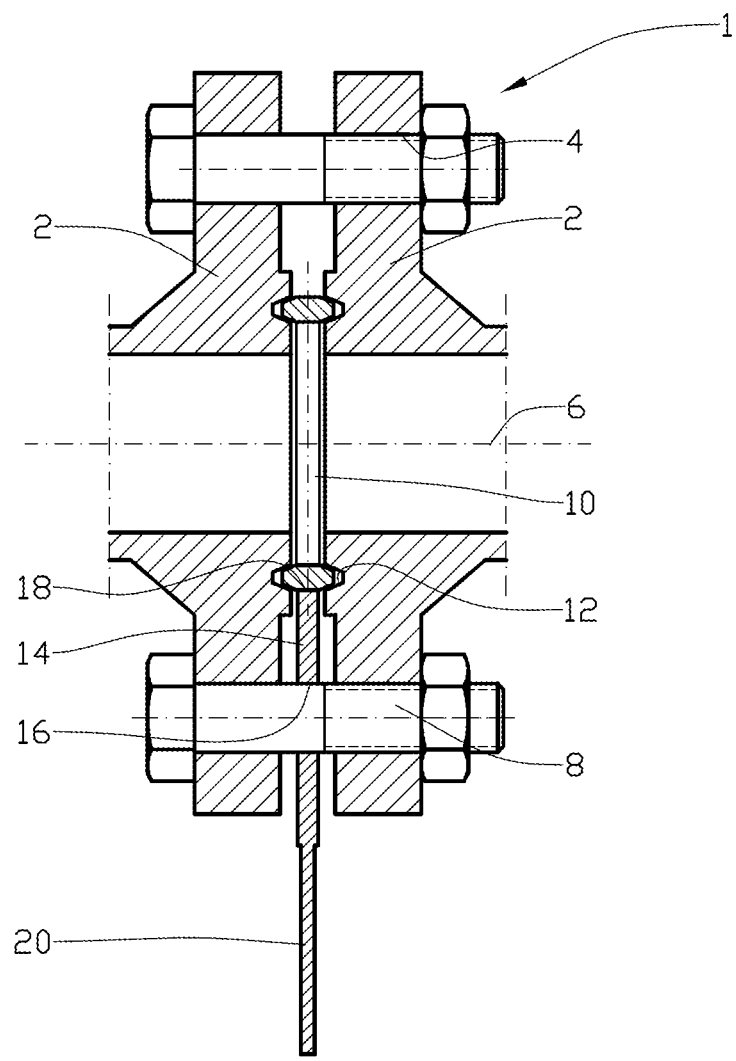
FIG. 3 shows an axial section of the pipe-flange connection after the gasket has hit an installation body and is fixed between the pipe-flange halves.
Figure 4:
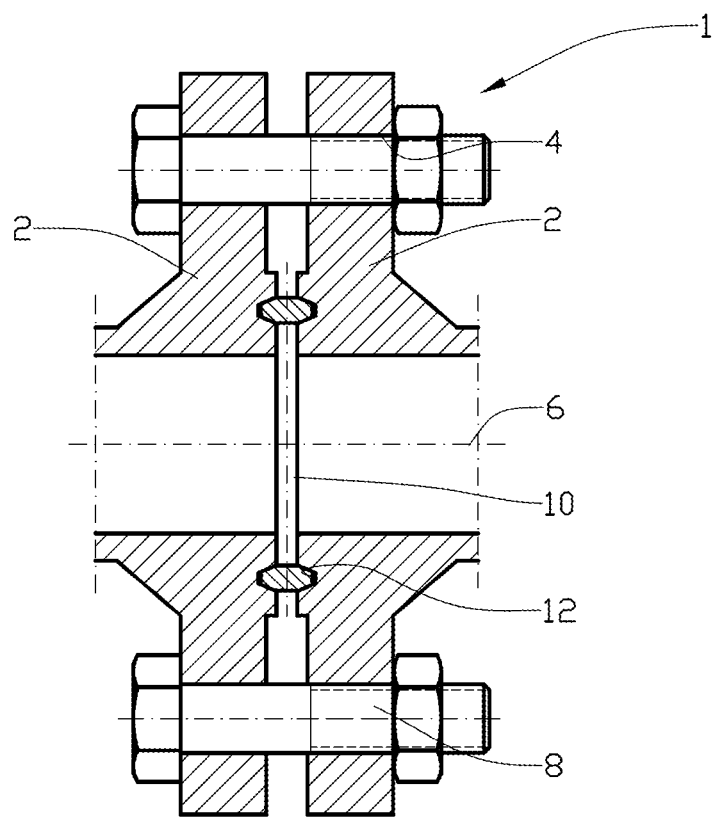
FIG. 4 shows the same as FIG. 3, but after the installation body has been removed and the pipe-flange halves have been pulled together.

In FIG. 2, an example in which two installation bodies 14 are arranged on respective bolts 8 is shown. The gasket 10 is inserted between the pipe-flange halves 2 by means of an auxiliary tool 22 until it hits the gasket stop 18 formed by the installation bodies 14. The gasket 10 is then in the correct radial position relative to the pipe-flange halves 2.

The bolts 8 are then tightened until the gasket 10 enters the annular grooves 12. Those of the bolts 8 that hold installation bodies 14 are then removed so that the installation bodies 14 can be removed. The pipe-flange halves 2 are then brought together to give a satisfactory seal.

In an embodiment not shown, in which a flat gasket is used, the pipe-flange halves 2 must be pulled together sufficiently for the flat gasket to be held in position before the installation bodies 14 are removed.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A method for installing a gasket between two pipe-flange halves, the pipe-flange halves being designed to be brought together by bolts extending through bolt holes in the pipe-flange halves, wherein the method comprises:
   arranging at least two installation bodies between the pipe-flange halves,
   attaching the installation bodies to respective bolts,
   letting the installation bodies form a gasket stop at a desired radial distance from a center axis of the pipe-flange halves,
   providing an auxiliary tool,
   inserting the gasket between the pipe-flange halves with the auxiliary tool until the gasket hits the installation bodies,
   retracting the auxiliary tool from between the pipe-flange halves, and
   clamping the gasket between the pipe-flange halves with the bolts.

2. The method according to claim 1, wherein the method further comprises:
   removing the installation bodies from the bolts.

3. A system for installing a gasket between two pipe-flange halves, the pipe-flange halves being designed to be brought together by bolts extending through bolt holes in the pipe-flange halves, wherein at least two installation bodies are arranged to be attached to respective bolts, forming a gasket stop between the pipe-flange halves at a desired radial distance from a center axis of the pipe-flange halves, wherein each installation body is provided with a handle, and wherein an auxiliary tool is arranged for inserting the gasket between the brought-together pipe-flange halves, and is provided with a handle extending outside a periphery of the pipe-flange halves during the installation of the gasket.

4. The system according to claim 3, wherein each installation body is provided with a through opening for the bolt.

5. The system according to claim 3, wherein each installation body is an annular disc.

\* \* \* \* \*